United States Patent [19]
Bauer et al.

[11] Patent Number: 5,904,260
[45] Date of Patent: May 18, 1999

[54] ELECTRICAL OUTLET BOX ASSEMBLY

[75] Inventors: Claude J. Bauer, Greenbrier; Oral F. Leep, Cottontown; Michael A. Swiney, Gallatin, all of Tenn.; Ronald Dean Wright, Byhalia, Miss.

[73] Assignee: Thomas & Betts Corporation, Memphis, Tenn.

[21] Appl. No.: 08/665,198

[22] Filed: Jun. 14, 1996

[51] Int. Cl.⁶ .................................................. H02G 3/08
[52] U.S. Cl. ........................... 220/3.8; 220/3.3; 220/339
[58] Field of Search .............................. 220/3.8, 3.3, 3.2, 220/339, 334

[56] References Cited

U.S. PATENT DOCUMENTS

| | | | |
|---|---|---|---|
| 1,120,872 | 12/1914 | Weis | 220/339 |
| 1,271,215 | 7/1918 | Platt | 220/3.2 |
| 1,604,516 | 10/1926 | Jacobsen | 220/3.8 |
| 3,701,451 | 10/1972 | Schindler . | |
| 3,734,335 | 5/1973 | Lincoln | 220/3.8 |
| 3,909,092 | 9/1975 | Kiernan | 220/339 |
| 3,980,197 | 9/1976 | Ware | 220/3.8 |
| 4,133,449 | 1/1979 | Ostrowsky | 220/339 |
| 5,119,966 | 6/1992 | McKim et al. | 220/3.8 |

FOREIGN PATENT DOCUMENTS

| | | | |
|---|---|---|---|
| 254498 | 7/1926 | United Kingdom | 220/3.8 |

Primary Examiner—Stephen J. Castellano
Attorney, Agent, or Firm—Michael L. Hoelter; Salvatore J. Abbruzzese

[57] ABSTRACT

An electrical outlet box assembly including an outlet box and a lid. The outlet box generally includes a base, an outer wall parametrically bounding the base and extending upwardly therefrom forming a box interior, the outer wall having an upper and lower end, the upper end forming a lip which defines an opening to the box interior. The assembly further includes a lid. The lid has a closed position such that when the lid is in the closed position the opening to the box interior is partially covered forming a receptacle opening having a size substantially similar to an opening of a standard size outlet box. The lid further includes an open position such that when the lid is in the open position, the opening to the box interior is entirely uncovered thereby permitting unrestricted access into the outlet box interior.

20 Claims, 5 Drawing Sheets

ELECTRICAL OUTLET BOX ASSEMBLY

FIELD OF INVENTION

The present invention relates generally to electrical outlet boxes. More particularly, the present invention relates to an electrical outlet box assembly for accommodating a receptacle, the assembly including an outlet box and a lid connected to the outlet box. When the lid is in an open position the box interior is entirely exposed and when the lid is in a closed position it forms a receptacle opening having a dimension that accommodates the receptacle.

BACKGROUND OF THE INVENTION

An electrical outlet box provides a termination point for wires carrying electrical current through buildings, houses and other structures. Wiring entering an outlet box is typically connected to a particular electrical fixture or receptacle such as a plug outlet or switch. The receptacle is mounted within the box along with a portion of the wiring connected to the receptacle. The box is then typically covered by a face plate having an opening therein to allow access to the outlet or switch while preventing electrified components from being exposed. Outlet boxes may be employed in concealed-wiring installations in which they are located within a wall or ceiling. Alternatively, outlet boxes may be used in exposed-conduit wiring installations where they are exteriorly mounted to a wall, column or ceiling.

Outlet boxes are available in a variety of configurations and sizes. The selection of which type of box to use is dependant upon the specifics of the application. The most commonly employed box is a single-gang outlet box, also referred to as a standard outlet box. The single-gang box is ideal for applications in which only one receptacle is required for the application. Standard outlet boxes have opening dimensions of approximately 3"×2¼" and are available in a variety of depths. Double-gang and triple-gang boxes are also available, and they typically have the capacity to hold two and three receptacles respectively. A four inch (4") square box is also commonly employed for multiple receptacle applications.

In order to install the receptacle, an installer is required to pull the wire through openings in the outlet box wall. Outlet boxes typically include such openings in the box wall in order to provide entry for the wires into the box. These openings are usually covered by removable portions called "knockouts" which can be easily removed by the installer as required. The pulling of the wires through the knockout openings, however, can prove fairly difficult and time consuming especially when the wire sizes are relatively large. This task becomes even more difficult when the outlet box does not provide adequate room for the installer to manually reach into the box. Large wires sizes such as AWG #6 to #12 are difficult to bend and manipulate, thereby increasing the time required for installation. Such large wire sizes are typically employed in residential applications for clothes dryer installations as well as cooking range installations. This is due to the fact that such devices typically operate at 240–250 volts and carry relatively large amounts of current, 30–50 Amps. The large wire sizes, therefore, are required to safely meet the load requirements of appliances such as ranges and dryers.

Large wires sizes also present a problem of storage of the wires once the receptacle has been connected. After the wires have been pulled through the wall openings into the box and the receptacle hooked up, a certain length of wire along with the receptacle must be stored in the outlet box. It is beneficial to store a sufficient amount of wire in the outlet box so that upon subsequent removal of the receptacle, the stored wire will unfold allowing for the receptacle to be serviced. If an insufficient amount of wire is stored in the outlet box, the wiring will tend to prevent the receptacle from being fully removed thus making any maintenance procedures time consuming and difficult. Storing an adequate amount of wire takes up a significant amount of space, and single-gang outlet boxes may not provide enough space when relatively large wire sizes are used.

Single-gang outlet boxes are ideal for many wiring applications and are commonly used in relatively low current 15–20 ampere, service. The wire sizes used in these applications are relatively small and easy to manipulate compared to the wiring used in dryer and range applications. The opening dimensions of standard sized outlet boxes is large enough to accommodate outlet receptacles used in dryer and range applications. However, the outlet box does not provide adequate space to allow for ease of wire installation or for storage due to the large wire sizes required by heavy current load applications. While increasing the depth of the box provides more storage for the wires, it increases the difficulty of pulling the wires into the box as the wire openings are typically in the bottom of the box or in a side wall close to the bottom. In addition, in certain applications the depth of the box must be kept to a minimum due to space constraints.

The problems associated with large wire sizes has been addressed in the prior art by using an outlet box that is larger than a single-gang box. A larger outlet box provides both the room for an installer to manipulate the wiring in order to pull the wire into the box, as well as providing space for the wire and the receptacle to be stored once the receptacle is installed.

Large outlet boxes include such outlet boxes as the 4" square and the double and triple-gang boxes. The 4" square box is typically surfaced mounted and includes a cover plate that covers the entire box. The cover includes cutouts that provide an opening for the outlet so the appliance may be plugged into the receptacle. Surface mounted boxes present several disadvantages such as taking up wall space and being aesthetically unappealing. Additionally, if a single receptacle is to be used with a 4" box a separated reducing component must be used to provide a mounting surface for the receptacle. The use of an extra component increases both the cost and time associated with the installation.

The double-gang box is typically formed from joining two single-gang boxes side to side, and therefore, has approximately twice the width as the single-gang outlet box. As previously stated, these boxes typically are used when two receptacles or switches are to be installed. While such outlet boxes are typically in-wall mounted, they still present the problem of not being aesthetically appealing since they require two cover plates in order to cover the entire box. In dryer and range applications, typically only one outlet is installed per box, therefore, in order to effectively cover the entire outlet box one cover plate is used to cover the receptacle and a second cover plate is needed to cover the remainder of the box opening. If a standard size single-gang outlet box had been employed, only one cover plate would be necessary, thereby reducing costs and presenting a more aesthetically appealing appearance.

It would, therefore, be desirable to have an outlet box which may be in-wall mounted, have an opening of a standard size single-gang outlet box, while still providing access to the interior of the outlet box in order to facilitate the introduction of wires into the box and provide space for the installation of the receptacle.

SUMMARY OF THE INVENTION

It is an object of the present invention to provide an electrical outlet box assembly for accommodating a receptacle having an outlet box with an opening partially covered by a lid.

It is a further object of the present invention to provide an electrical outlet box assembly for accommodating a receptacle having an outlet box and a lid. The lid having a closed position such that when the lid is in the closed position the opening to the outlet box interior is partially covered and the lid forms a receptacle opening having a dimension which accommodates the receptacle.

It is still a further object of the present invention to provide an electrical outlet box assembly for accommodating a receptacle having an outlet box and a lid. The lid having an open position such that when the lid is in the open position the opening to the outlet box interior is entirely uncovered thereby permitting unrestricted access into the outlet box interior.

In the efficient attainment of these and other objects, the present invention provides an electrical outlet box assembly for accommodating a receptacle. The assembly includes an outlet box and a lid. The outlet box includes a base and an outer wall parametrically bounding the base and extending upwardly therefrom forming a box interior. The outer wall having an upper and lower end, the upper end forming a lip which defines an opening to the outlet box interior. The opening has a dimension greater than that necessary to accommodate the receptacle. The lid has a opened and closed position such that when said lid is in the closed position the opening to the box interior is partially covered and forms a receptacle opening having a dimension which accommodates the receptacle.

As more specifically described by way of the preferred embodiment herein, the outlet box has a front wall, back wall and a pair of side walls. Each of the walls has openings therethrough to allow for entry of electrical wiring into the box interior. The lid is substantially L-shaped having a cover and wall portion. The cover portion is hingedly attached to the front wall of the box by a thin strip of material forming a living hinge. The wall portion of the lid forms a side wall of the receptacle opening. The lid further includes a locking means including latches for securing the lid in the closed position. The latches engage projections that extend outwardly from the side walls of the outlet box. The outlet box further includes a pair of mounting ears having an aperture therethrough. The mounting ears provide a means for securing the outlet box assembly to a structure.

In formation of the outlet box assembly, the outlet box and the lid may be integrally molded with the outlet box.

DETAILED DESCRIPTION OF THE PREFERRED EMBODIMENT

Figure 1:
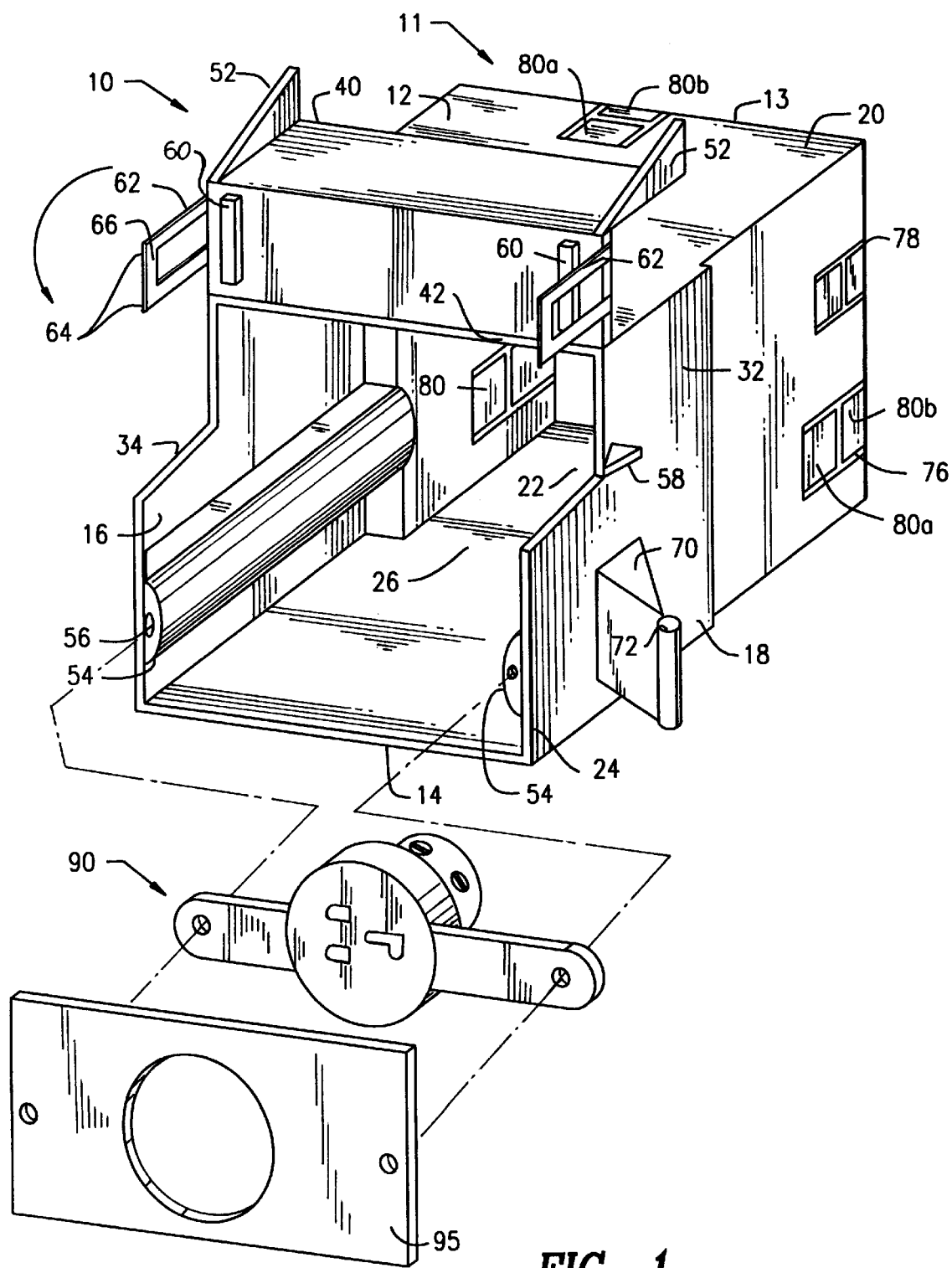
FIG. 1 is an exploded perspective view of the outlet box assembly of the present invention.

With reference to FIG. 1, an outlet box assembly 10 formed in accordance with the present invention is shown. The outlet box assembly is adapted to accommodate a receptacle 90 and a cover plate 95. Outlet box assembly 10 includes an outlet box 11 and a lid 40. The outlet box preferably has a volume of 30 cubic inches and can accommodate the standard 3-prong or 4-prong plug receptacles used in dryer and plug and cord range applications as well as all receptacles compatible with standard size single-gang outlet boxes which are well known in the art. The term standard size outlet box is also used in this disclosure to refer to a single-gang outlet box. Outlet box 11 is preferably formed from a molded polymer such as polyvinyl chloride (PVC), however, other suitable material may also be employed.

Figure 2:
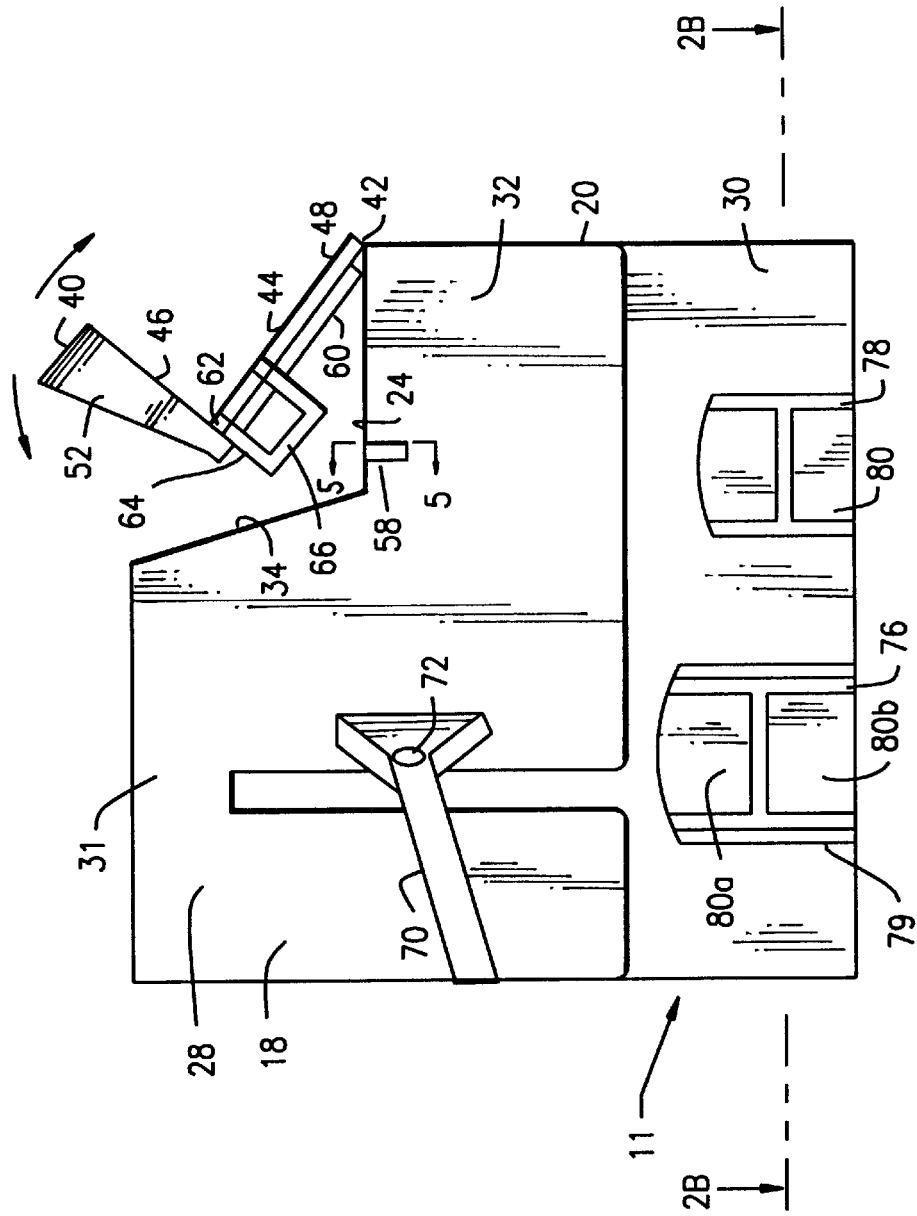
FIG. 2 is a side elevational view of the outlet box of the present invention.

With further reference to FIGS. 1 and 2, outlet box 11 includes a substantially planar rectangular base wall 13 that is parametrically bounded by an outer wall 12 forming a box interior 22. Outer wall 12 extends upwardly from base wall 13 ending in a rim 24 that defines an opening 26 into box interior 22. Outer wall 12 is comprised of a back wall 14, two opposed side walls 16, 18 and a front wall 20 all of which are substantially planar. Each of the walls 14,16,18 has an upper portion 28 and a lower portion 30. The front wall 20 is spaced from and substantially parallel to back wall 14 and is disposed between side walls 16, 18. In the preferred embodiment, opening 26 has a width, defined by the distance between front wall 20 and back wall 14, of approximately 3 5/16 inches and a length, defined by the distance between side wall 16 and side wall 18, of approximately 3½ inches.

Additionally, side walls 16,18 and front wall 20 further include various wire openings 76,78 through which electrical wiring can enter box interior 22. In the preferred embodiment, two different size wire openings are employed with each size accommodating different size wires. Large wire openings 76 can accommodate wire sizes AWG #6 and #8 and the small wire openings 78 can accommodating AWG #10 through #14 wire sizes. Wire openings 76,78 are covered by knockouts 80 which are frangibly connected to box 11, and therefore, can be easily removed by an installer in order to allow for the wires to enter box interior 22. In the preferred embodiment, the knockouts are comprised of two frangible members 80a, 80b. One member 80a extending downwardly from the top of the wire opening, and the other member 80b extending upwardly from the bottom of the wire opening.

Figure 2A:
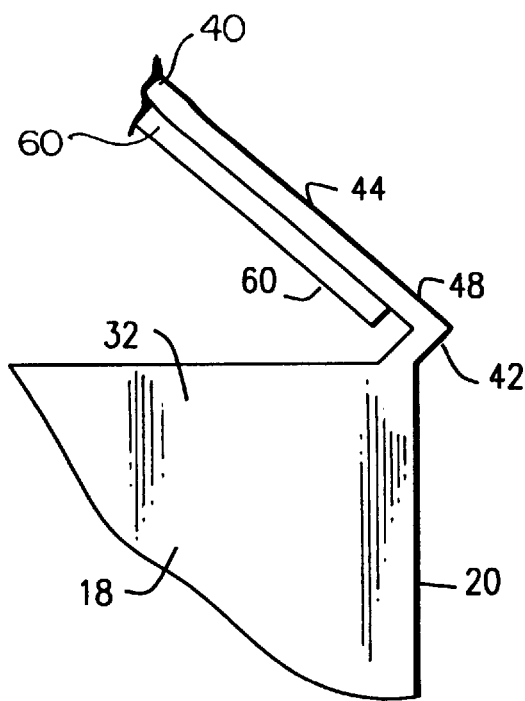
FIG. 2A is a partial enlarged view of the outlet box assembly of FIG. 2.
Figure 2B:
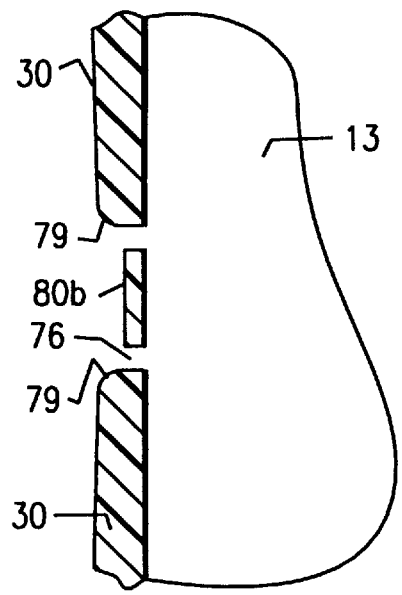
FIG. 2B is a partial enlarged sectional view taken along line 2B—2B of FIG. 2.

As shown in FIGS. 2 and 2B the wall portions adjacent the wire opening 76 may include inwardly curved portions forming radii 79. Each radius 79 provides a smooth path over which the wire may travel to allow for ease of wire entry into the box interior 22. It is within the contemplation of the present invention that such radii may be included on the wall portions adjacent small opening 78.

As shown in FIG. 1, back wall 14 has a uniform height throughout its length, therefore, the portion of rim 24 defined by the upper portion of back wall 14 is substantially linear.

Referring to FIGS. 1 and 2, side walls 16,18 are similarly formed. Side walls 16,18, unlike back wall 14, do not have a uniform height throughout their lengths, but instead have substantially two heights. The portions of side walls 16,18 adjacent back wall 14 have the same height as back wall 14 forming full height sections 31. At a point on side walls 16,18, approximately half way between back wall 14 and front wall 20, the height of side walls 16,18 is reduced forming reduced height sections 32. Side walls 16,18 also include a transition section 34 disposed between the reduced height section 32 and the full height sections 31. It is in the transition section 34 that the height of the side wall 16,18 decreases and rim 24 inclines downwardly toward front wall 20. Front wall 20 is preferably of the same height as the reduced height sections 32 of side walls 16,18.

Outlet box assembly further includes lid 40. In the preferred embodiment shown in FIG. 2, lid 40 is formed from a polymer material such as PVC and is connected to box 11 along the portion of rim 24 that corresponds to the upper end of front wall 20. Lid 40 is connected to box 11 by a thin strip of material forming a living hinge 42, as shown in FIG. 2A. In the preferred embodiment the lid 40, hinge 42 and box 11 may be integrally molded as one piece. Alternatively, lid 40 and box 11 may each be formed separately and lid 40 may be subsequently joined to box 11. In this alternative embodiment, box 11 and lid 40 may be joined by a process such as ultrasonic welding which is well known in the art. It is also within the contemplation of the invention that lid 40 not be joined to box 11 by a hinge but instead is a separate component unattached to box 11.

Figure 3:
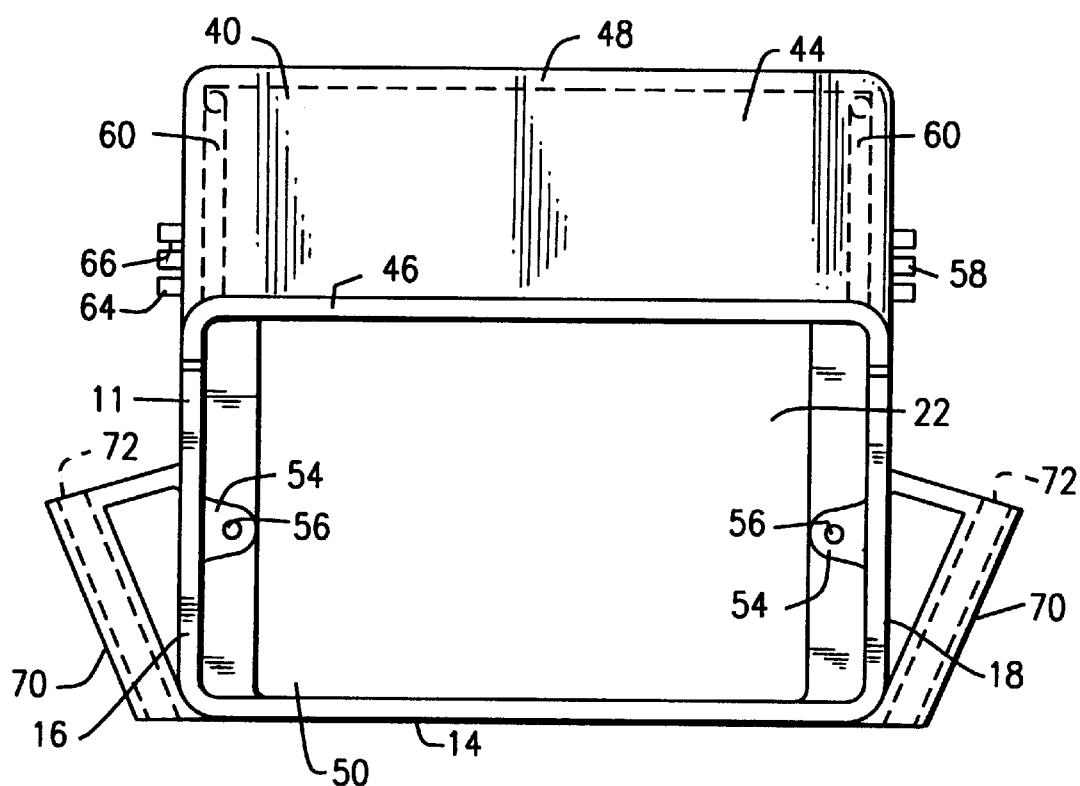
FIG. 3 is top plan view of the outlet box assembly of the present invention.

Lid 40 includes a cover portion 44 and a lid wall portion 46. Cover portion 44 and lid wall portion 46 are substantially perpendicular to each other forming an L-shaped member. Outer edge 48 of cover portion 44 is joined to box 11 by hinge 42. Lid 40 is rotatably moveable about hinge 42 between an opened and closed position. The Hinge 42 allows an installer to easily open and close lid 40. FIG. 1 shows lid 40 in substantially the fully open position, and FIG. 3 shows lid 40 in the fully closed position. When lid 40 is in the open position full access to box interior 22 is provided. Such full access facilitates easy hook up of receptacle 90 by reducing the difficulty of pulling the wiring into the box 11.

Range and dryer applications typically require wire sizes such as AWG #'s 6,8,10,12, and 14 in order to accommodate the current load associated with such devices, 30–50 Amps. Many of these wires have large diameter conductors and are, therefore, difficult to bend and manipulate. Thus, pulling the wires into the outlet box is difficult and time consuming for the installer. By exposing the entire box interior when lid 40 is in the open position, the present invention reduces the difficulties encountered by the installer when attempting to reach into the box and pull the wires through wire openings 76,78. In addition, the reduced height sections 32 of side walls 16,18 decrease the difficulty of pulling wires into box 11 since the installer's hand may easily reach to the base wall 13 unimpeded by the rim of the back wall and the full height sections 31 of the side walls.

Referring back to FIG. 3, when lid 40 is in the closed position, outlet box opening 26 is partially covered and access to box interior 22 is restricted. In the closed position, lid cover portion 44 is substantially parallel to base wall 13 and covers the portion of box interior 22 which is defined by front wall 20 and the reduced height sections 32 of side walls 16,18. Lid wall portion 46 aligns with upper portion of side walls 16,18 forming a receptacle opening 50.

Receptacle opening 50 is substantially rectangular and defined by lid wall portion 46 and the upper portions of side walls 16,18 and back wall 14. Receptacle opening 50 is dimensioned to accommodate a variety of standard size electrical receptacles including plug receptacles of the type used in clothes dryer and cord and plug cooking range applications. Opening 50 has a dimension substantially equivalent to the opening of a single-gang outlet box. Single-gang outlet boxes typically have an opening width in the range of 2 to 2½ inches and an opening length in the range of 3 to 3¾ inches. A typical single-gang outlet box has a width of 2¼ inches and a length of 3 inches. The length of the opening will vary depending on if receptacle mounting members disposed on the box are interior or exterior to the box opening. An outlet box having the receptacle mounting members disposed interior to the box will have a length of approximately 3½ inches. In the preferred embodiment of the present invention, receptacle opening 50 has a 2¼ inch width and a length of 3½ inches. The preferred dimensions are illustrative and not intended to be limiting.

Accordingly, the installer may move lid 40 to the open position in order to gain full access to box interior 22 to aid in pulling the wiring into the box. Once the wiring has been pulled in the box, the installer may then quickly and easily move lid 40 to the closed position to allow for installation of the receptacle.

It is also within the contemplation of this invention that opening 50 be of any size in order to accommodate a single receptacle. Opening 50, therefore, could be dimensioned to accommodate an over-sized receptacle which would not fit in a standard single-gang outlet box. Such receptacles are typically used in commercial applications.

The outlet box assembly 10 may be in-wall mounted such that the only exposed portion of the box is the receptacle opening 50 after the wall material such as dry-wall is installed. Opening 50, which is substantially equivalent to a single-gang outlet box opening, receives a receptacle 90 and can then be cover by a single cover plate 95. Such a mounting provides a clean aesthetically pleasing appearance while taking up a minimum amount of wall space.

As shown in FIGS. 1 and 2, lid 40 further includes a pair of outwardly projecting triangular-shaped wings 52 located on the outer side edges of wall portion 46. Wings 52 extend toward back wall 14 and are generally parallel and in line with side walls 16,18. When lid 40 is in the closed position, each wing 52 aligns with its corresponding side wall and fills in a space defined by the side wall transition section 34.

Referring back to FIG. 1, the fill height sections 31 of side walls 16, 18 also include a pair of bead portions 54 projecting inwardly toward box interior 22. Bead portions 54 extend from rim 24 of side walls 16,18 and extend downwardly toward base wall 13. Each of the bead projections 54 have apertures 56 disposed therethrough. Apertures 56 are adapted to receive fastening hardware used to secure receptacle 90 and cover plate 95 to outlet box 11. Receptacle 40 may be supported in box 11 using screws or other fastening means as is well known in the connection art. The distance between apertures 56 is preferably 3⁵⁄₁₆" which corresponds to the standard distance between mounting holes on electrical receptacles.

Figure 4:
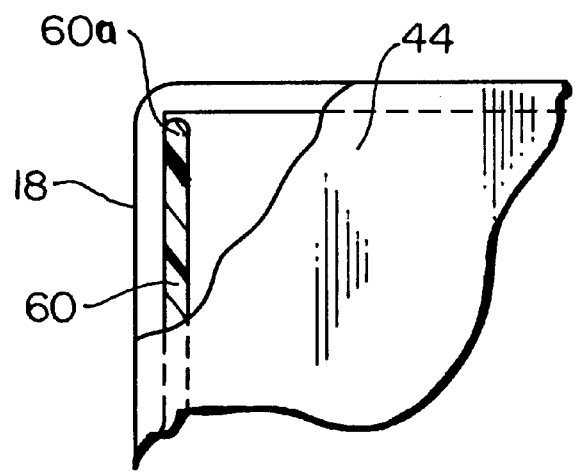
FIG. 4 is a partial enlarged view of FIG. 3 with a portion of the lid removed for clarity showing an aligner of the present invention.

Due to the tolerances in the manufacturing process, lid 40 may not precisely align with box 11. Therefore, as shown in FIGS. 1–4, lid 40 preferably includes a pair of linear aligners 60 that project outwardly from the bottom surface of lid cover portion 44. Each aligner 60 is inset from the edge of cover portion 44 and positioned such that when lid 40 is in the closed position aligners 60 align with their corresponding side wall 16,18. If lid 40 is misaligned with box 11, and more specifically side walls 16,18, aligners 60 will abut side walls 16,18 and tend to force the components into proper alignment. As shown in FIG. 4, aligner 60 may include a beveled end portion 60a. The curvature of the bevel substantially corresponds to the curverture formed by the corners where front wall 12 meets side walls 16,18. As lid 40 is rotated toward the closed position, beveled end portions 60a assist in providing a tapered lead so that aligners 60 will smoothly engage the inner surface of the side walls.

Figure 5:
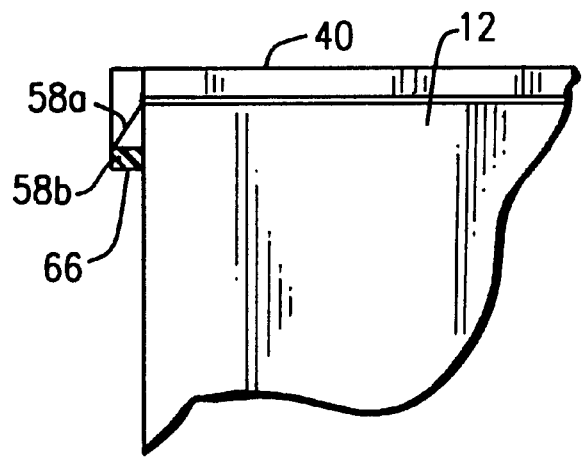
FIG. 5 is a partial sectional view taken along line 5—5 of FIG. 3 of the locking device of the present invention with the lid in the closed position.

In order to maintain lid 40 in the closed position, the preferred embodiment includes a locking device. As shown in FIGS. 1 and 5, the locking device includes a pair of latches 62 that extend outwardly from cover portion 44. Each latch is generally U-shaped and includes two legs 64 connected by a bottom member 66. One latch 62 is located on each side of cover portion 44 adjacent lid wall portion 46. The locking device further includes triangular-shaped projections 58 located on side walls 16, 18 such that when lid 40 is closed, latches 62 engage projections 58.

The locking device operates such that when lid 40 is rotated toward the closed position bottom member 66 engages inclined edge 58a of projection 58. The legs 64 are deflectable, therefore, bottom member 66 is forced outwardly as it rides over inclined surface 58a until it reaches the end of edge 58a at which point member 66 snaps underneath projection 58 as shown in FIG. 5. Bottom member 66 engages the flat portion 58b of projection 58, thereby securing lid 40. The lid may be subsequently opened by forcing the bottom members 66 outwardly until they clear projections 58 and then rotating lid 40 toward the open position. In an alternative embodiment, the locking device may include latches formed on the side walls of the box with the projections being located on the lid (not shown). It is also within the contemplation of the present invention that the locking device may be formed in a variety of ways that are well known in the latching arts.

Outlet box 11 further includes a pair of mounting ears 70. Referring to FIGS. 2 and 3, ears 70 are preferable triangular shaped and extend outwardly from side walls 16,18. The back end of each ear 70 is aligned with back wall 14. Each ear has an aperture 72 passing therethrough and is adapted to receive a fastening device such as a screw or nail in order to secure box assembly to a structure such as a stud or beam. Each aperture 72 extends generally from the front to the back of box 11. In the preferred embodiment, apertures 72 are inclined inwardly and downwardly. Such inclination of apertures 72 allows for the fastening device to be easily secured to the structure.

The outlet box assembly is preferably formed from one piece of integrally molded polymer material such as PVC. Alternatively, outlet box 11 and all its features can be integrally molded separate and apart from lid 40 which along with all its components can likewise be integrally molded. In the alternative embodiment, lid 40 and box 11 can subsequently be attached as stated above.

While a plastic box is shown the concept may be employed in a metal box with a hinged lid.

Various changes to the foregoing described and shown structures would now be evident to those skilled in the art. Accordingly, the particularly disclosed scope of the invention is set forth in the following claims.

We claim:

1. An outlet box assembly for accommodating a receptacle comprising:

an outlet box including a base, an outer wall perimetrically bounding said base and extending upwardly therefrom forming a box interior, said outer wall having an upper and lower portion, said upper portion forming a lip which defines an opening to said box interior, said opening having a dimension greater than that necessary to accommodate said receptacle, said outer wall further including an edge defining at least one wire opening, said wire opening forming a passage for wiring to enter said box interior, a portion of said edge being curved inwardly, thereby providing a smooth path over which said wiring may travel; and a lid having a closed position such that when said lid is in said closed position said opening to said box interior is partially covered and forms a receptacle opening having a dimension which accommodates said receptacle.

2. An outlet box assembly for accommodating a receptacle comprising:

an outlet box including a base, an outer wall perimetrically bounding said base and extending upwardly therefrom forming a box interior, said outer wall having an upper and lower portion, said upper portion forming a lip which defines an opening to said box interior, said opening having a dimension greater than that necessary to accommodate said receptacle;

a lid hingedly secured to said outer wall, said lid being movable between an open and closed position, such that when said lid is in said closed position said opening to said box interior is partially covered and forms a receptacle opening having a dimension which accommodates said receptacle; and a lid locking device for selectively latching and unlatching said lid in said closed position such that said lid may be unlatched and moved to said open position.

3. An outlet box assembly as defined in claim 2, wherein said receptacle opening is bounded by four sides, three of said sides formed by said upper portion of said outer wall and one of said sides is formed by said lid when in said closed position.

4. An outlet box assembly as defined in claim 3, wherein said receptacle opening is sized to accommodated a standard sized receptacle.

5. An outlet box assembly as defined in claim 2, wherein said outer wall being comprised of a back wall, a front wall and a pair of side walls, said receptacle opening being formed from portions of said back wall, said side walls and said lid.

6. An outlet box assembly as defined in claim 5 wherein said lid includes a cover portion and a wall portion, said cover and wall portions being joined together in a substantially perpendicular manner resulting in a substantially L-shaped lid.

7. An outlet box assembly as defined in claim 6, wherein said lid wall portion forms a part of said receptacle opening.

8. An outlet box assembly as defined in claim 7, wherein said lid is hingedly connected to said front wall.

9. An outlet box assembly as defined in claim 8, wherein an edge of said cover portion is attached to said front wall by a strip of material forming a living hinge, said hinge allowing said lid to travel between said open and closed position.

10. An outlet box assembly as defined in claim 2, wherein said outlet box and said lid are integrally formed of a polymer material.

11. An outlet box assembly as defined in claim 2, wherein said lid locking device includes a plurality of resilient latches extending from said lid, and said outer wall includes a corresponding number of projections, said latches and said projections are so aligned such that when said lid is moved into said closed position each of said latches frictionally engages a corresponding projection, thereby locking said lid in said closed position.

12. An outlet box assembly as defined in claim 2, further including a means for securing said box to a structure.

13. An outlet box assembly as defined in claim 12, wherein said securing means includes a pair of triangular-shaped ears, each ear being disposed on said outer wall, said ears having a aperture extending therethrough to accommodate a fastening device.

14. An outlet box assembly as defined in claim 2, wherein said outer wall further includes at least one wire opening, said wire opening forming a passage for wiring to enter said box interior.

15. An outlet box assembly as defined in claim 14, wherein said outer wall includes an edge defining said wire opening, and a portion of said edge being curved inwardly, thereby providing a smooth path over which said wiring may travel.

16. An outlet box assembly as defined in claim 14, wherein said outer wall includes a plurality of wire openings disposed on said lower portion of said outer wall, and at least one of said wire openings being smaller than said other wire openings such that said box can accommodate a variety of wire sizes.

17. An outlet box assembly as defined in claim 15, wherein said wire opening is covered by a knockout, said knockout being formed of at least one frangible projection extending from said box over said wire opening, said projection being removable to allow for the passage of wires into said box.

18. An outlet box assembly as defined in claim 2, wherein said opening dimension of said reduced receptacle opening is substantially similar to an opening dimension of a single-gang outlet box.

19. An outlet box assembly as defined in claim 18, wherein said reduced receptacle opening dimension includes a width dimension in the range of approximately 2 to 2½ inches and a length dimension in the range of 3 to 3¾ inches.

20. An outlet box assembly as defined in claim 2, wherein said lid includes elongate projections extending therefrom and abutting said outer wall when said lid is in said closed position in order to provide alignment of said lid with respect to said box.

* * * * *